United States Patent
Dennis

(10) Patent No.: US 7,865,564 B2
(45) Date of Patent: *Jan. 4, 2011

(54) METHOD AND SYSTEM FOR PUBLISHING AN ELECTRONIC FILE ATTACHED TO AN ELECTRONIC MAIL MESSAGE

(75) Inventor: Gary J. Dennis, Duluth, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/207,103

(22) Filed: Sep. 9, 2008

(65) Prior Publication Data

US 2009/0006573 A1 Jan. 1, 2009

Related U.S. Application Data

(63) Continuation of application No. 11/592,367, filed on Nov. 3, 2006, now Pat. No. 7,424,517, and a continuation of application No. 10/714,722, filed on Nov. 17, 2003, now Pat. No. 7,143,140, and a continuation of application No. 09/238,445, filed on Jan. 28, 1999, now Pat. No. 6,651,087.

(51) Int. Cl.
*G06F 15/16* (2006.01)

(52) U.S. Cl. ............... 709/206; 709/202; 709/205; 709/217; 709/219; 715/752; 715/761

(58) Field of Classification Search ......... 709/202–203, 709/205–207, 217–219, 225, 229, 235; 715/751–753, 715/761

See application file for complete search history.

(56) References Cited

U.S. PATENT DOCUMENTS

| | | |
|---|---|---|
| 5,293,250 A | 3/1994 | Okumura et al. |
| 5,675,507 A | 10/1997 | Bobo, II |
| 5,771,355 A | 6/1998 | Kuzma |
| 5,781,901 A | 7/1998 | Kuzma |
| 5,790,790 A | 8/1998 | Smith et al. |
| 5,793,972 A | 8/1998 | Shane |
| 5,867,281 A | 2/1999 | Nozoe et al. |
| 5,878,230 A | 3/1999 | Weber et al. |
| 5,903,723 A | 5/1999 | Beck et al. |
| 5,958,005 A | 9/1999 | Thorne et al. |

(Continued)

*Primary Examiner*—Bharat N Barot
(74) *Attorney, Agent, or Firm*—Cantor Colburn LLP

(57) ABSTRACT

Publishing content associated with an electronic file attached to an electronic mail message by executing instructions contained in the electronic mail attachment and accessing the content at a remote computer server identified by the attached file. The attached file includes computer-executable instructions, such as a computer program or script, which include an identifier for a remote server connected to a distributed computer network. This identified remote server typically hosts a web site containing content intended for viewing by the recipient of the electronic mail message. In response to launching the attached file of the electronic mail message with a viewer program, a browser program can be opened to enable the recipient to view the content of the identified remote server, typically a web site on an intranet or the global Internet. This supports the communication of electronic content by using an electronic mail message to transport an electronic file attachment having instructions that, when executed by the recipient's computer, enable the recipient to view the electronic content by accessing a server computer connected to distributed computer network.

14 Claims, 7 Drawing Sheets

U.S. PATENT DOCUMENTS

| | | |
|---|---|---|
| 6,065,048 A | 5/2000 | Higley |
| 6,073,133 A | 6/2000 | Chrabaszcz |
| 6,091,409 A | 7/2000 | Dickman et al. |
| 6,092,114 A | 7/2000 | Shaffer et al. |
| 6,175,857 B1 | 1/2001 | Hachiya et al. |
| 6,192,407 B1 | 2/2001 | Smith et al. |
| 6,219,054 B1 | 4/2001 | Komoda et al. |
| 6,230,186 B1 | 5/2001 | Yaker |
| 6,233,213 B1 | 5/2001 | Okada et al. |
| 6,233,318 B1 | 5/2001 | Picard et al. |
| 6,237,040 B1 | 5/2001 | Tada |
| 6,256,666 B1 | 7/2001 | Singhal |
| 6,266,810 B1 | 7/2001 | Tanaka et al. |
| 6,275,848 B1 | 8/2001 | Arnold |
| 6,275,850 B1 | 8/2001 | Beyda et al. |
| 6,301,245 B1 | 10/2001 | Luzeski et al. |
| 6,308,151 B1 | 10/2001 | Smith |
| 6,311,210 B1 | 10/2001 | Foladare et al. |
| 6,332,156 B1 | 12/2001 | Cho et al. |
| 6,332,164 B1 | 12/2001 | Jain |
| 6,351,763 B1 | 2/2002 | Kawanaka |
| 6,360,252 B1 | 3/2002 | Rudy et al. |
| 6,366,949 B1 | 4/2002 | Hubert |
| 6,430,177 B1 | 8/2002 | Luzeski et al. |
| 6,463,462 B1 | 10/2002 | Smith et al. |
| 6,466,968 B2 | 10/2002 | Shirai et al. |
| 6,477,243 B1 | 11/2002 | Choski et al. |
| 6,487,599 B1 | 11/2002 | Smith et al. |
| 6,651,087 B1 | 11/2003 | Dennis |
| 6,735,741 B1 | 5/2004 | Pannu |
| 6,859,213 B1 | 2/2005 | Carter |
| 7,143,140 B2 | 11/2006 | Dennis |
| 7,155,681 B2 | 12/2006 | Mansour et al. |
| 7,191,219 B2 | 3/2007 | Udell et al. |
| 7,424,517 B2 * | 9/2008 | Dennis ....................... 709/206 |

* cited by examiner

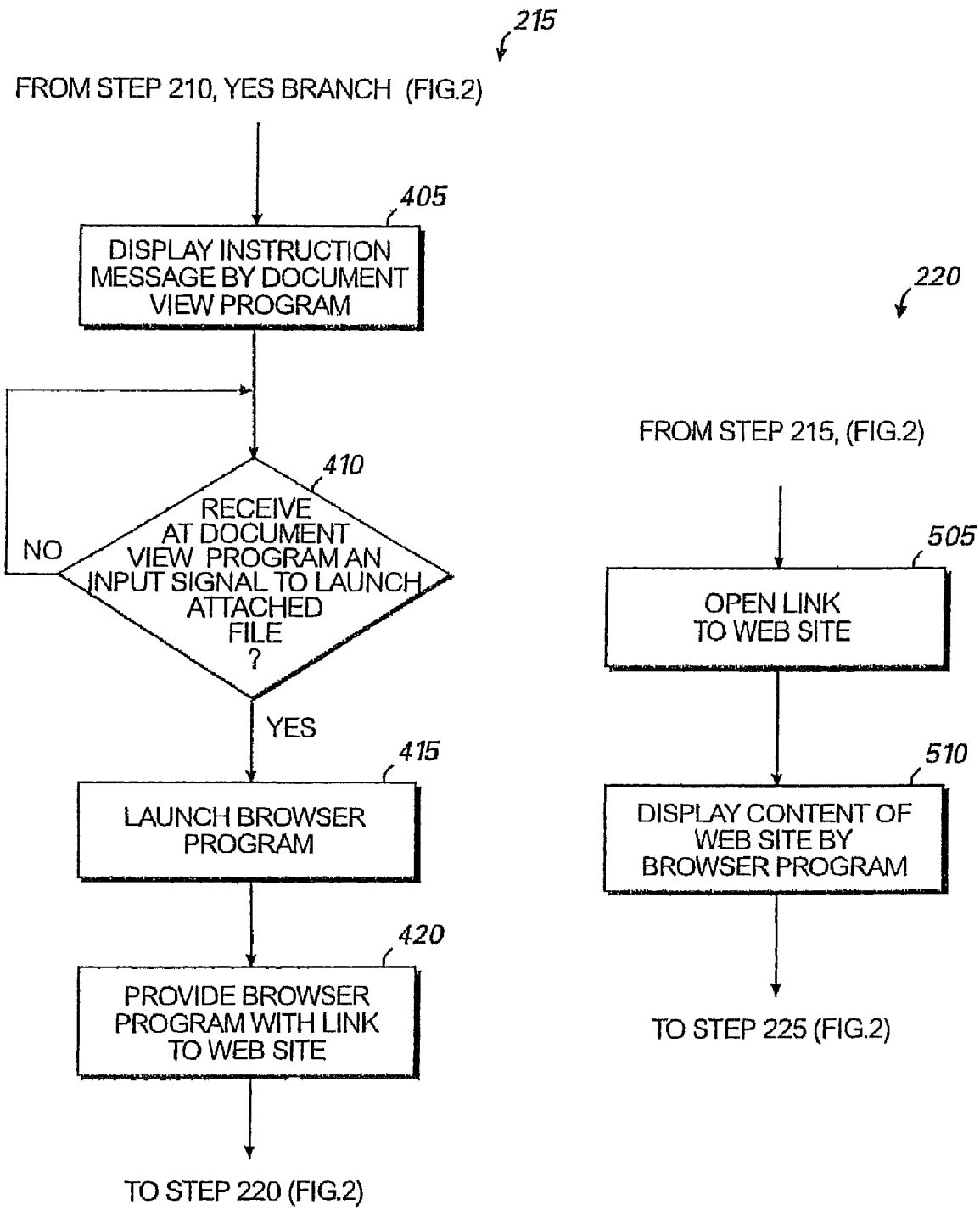

US 7,865,564 B2

METHOD AND SYSTEM FOR PUBLISHING AN ELECTRONIC FILE ATTACHED TO AN ELECTRONIC MAIL MESSAGE

CROSS-REFERENCE TO RELATED APPLICATIONS

This application is a continuation of U.S. patent application Ser. No. 11/592,367 filed Nov. 3, 2006, the contents of which are incorporated by reference herein in their entirety, which is a continuation of U.S. patent application Ser. No. 10/714,722 filed Nov. 17, 2003, now U.S. Pat. No. 7,143,140, the contents of which are incorporated by reference herein in their entirety, which is a continuation of U.S. patent application Ser. No. 09/238,445 filed Jan. 28, 1999, now U.S. Pat. No. 6,651,087, the contents of which are incorporated by reference herein in their entirety.

TECHNICAL FIELD

The present invention is generally directed to viewing content associated with an electronic file attached to an electronic mail message. The invention supports publication of content associated with an electronic file attachment by launching a file attachment, thereby resulting in the execution of computer instructions that launch a browser program which displays the content at a web site identified by the file attachment.

BACKGROUND OF THE INVENTION

Electronic mail programs are used by business and residential users to communicate information contained within the body of an electronic mail message or attached as an electronic file or document to the electronic mail message. For example, a user can save a business report as an electronic document prepared by a word processing program and attach this electronic document to an e-mail message for distribution to designated recipients. Another representative example is the transmission of an electronic mail message having an attached multi-media presentation file, such as a Microsoft "POWERPOINT" slide show, to designated recipients at physically remote locations. Users of electronic mail programs commonly use electronic mail messages as a carrier mechanism for forwarding electronic files or documents via a computer network to one or more designated recipients.

Although the combination of an electronic mail program and a distributed computer network provides an efficient communication system for communicating with multiple parties, the capacity of this electronic mail system to support communications can be degraded by the transfer of messages having large-sized attachments. Electronic mail users observe this degradation of electronic mail system performance as a delay in completing the transmission or reception of a message having a large file attachment. This is especially evident when accessing electronic mail remotely over low speed modem connections. Also, system administrators view the exchange of attached electronic files via the electronic mail system as a storage capacity issue because communication of these large file attachments requires electronic mail servers having sufficient capacity to store both messages and attachments for system users.

In view of the foregoing, there is a need for providing the recipient of an electronic mail message with the ability to access electronic content without forwarding this content as an attached file or document of an electronic mail message. There is a further need for communicating the content of a large electronic file or document to a remote recipient without forwarding the entire content as an attachment to an electronic mail message. The present invention solves these and other needs of the prior art by publishing content at a web site viewable by an electronic mail recipient in response to accessing an attached file of an electronic mail message transmitted to that recipient.

SUMMARY OF THE INVENTION

The present invention provides a computer-implemented method and system for communicating content intended for delivery to a recipient of an electronic mail message having an attached electronic file. The attached electronic file can be accessed in response to an input signal issued by an input device, such as a keyboard or pointing device, that is manipulated by the recipient of the electronic mail message. The identity of a remote server computer, such as a web site on an intranet or the global Internet, can be obtained in response to accessing the attached electronic file. The remote server computer publishes the content intended for communication to the email message recipient. This content can be displayed to the recipient by using the identity to establish a connection with the remote server. By providing the recipient of the electronic mail message with an automated mechanism for viewing the content at this identified remote server computer, the present invention eliminates the need to store this content within the attached file itself.

More particularly described, the present invention supports the communication of electronic content by using an electronic mail message to transport an electronic file attachment having instructions that, when executed by the recipient's computer, enable the recipient to view the electronic content by accessing a server computer identified by the electronic file attachment. In response to an input signal transmitted by a user's manipulation of an input device, the electronic file attachment is accessed by an electronic mail program. This electronic file attachment is typically opened for viewing within the viewing window of a document view program. For one aspect of the invention, the electronic file attachment contains a limited amount of content, such as a text-based instruction message, for viewing by the recipient within the viewing window. For example, a representative instruction message offers the recipient instructions on how to access a larger set of content by launching the electronic file attachment. In response to an input signal for launching the electronic file attachment, a browser program is launched to access content at a remote server computer identified by the attached file. This results in an automated transition from the electronic mail program environment to the browser program environment to support viewing of the content hosted at the remote server computer.

Prior to the advent of the present invention, a user of an electronic mail program would have forwarded content of interest to the recipient of the electronic mail message within the body of an electronic mail attachment. The present invention enables the user to post content at a remote server computer and to send an electronic mail attachment containing instructions (rather than lengthy content) that command the recipient's computer to identify and access this content at the remote server computer. By accessing the electronic mail attachment, instructions contained in this attached file are executed to support the presentation by a browser program of content maintained at the identified remote server computer. The attached file can include an identifier, such as an address or link for a web site, that identifies a storage mechanism other than the electronic mail attachment for the content intended for delivery to the recipient of the electronic mail message.

Advantageously, the present invention does not suffer from the performance problems of the prior art. Electronic content intended for delivery to the recipient of a electronic mail message can be communicated by a web site identified by an electronic mail attachment rather than by storing this content within the electronic mail attachment itself. The information publication power of a distributed computer network, such as a corporate intranet or the global Internet, is leveraged by enabling a recipient of an electronic mail message to access an attached file and to "jump" from the electronic mail program to content hosted at a remote computer site and viewable by a browser program. In this manner, the storage resources of an electronic mail system are conserved because the present invention eliminates the need to send lengthy file attachments with electronic mail messages to communicate information to the recipients of such messages.

The various aspects of the present invention may be more clearly understood and appreciated from a review of the following detailed description of the disclosed embodiments and by reference to the appended drawings and claims.

DESCRIPTION OF THE DRAWINGS

FIG. 4 is a logical flowchart diagram illustrating the steps of a method for publishing content associated with an electronic mail attachment at a web site in accordance with an exemplary embodiment of the present invention.

FIG. 5 is a logical flow chart diagram illustrating the steps of a method for opening a web site link identified by an electronic mail attachment in accordance with an exemplary embodiment of the present invention.

DETAILED DESCRIPTION OF THE
EXEMPLARY EMBODIMENTS

The present invention provides a convenient and effective mechanism for communicating information with the assistance of an electronic mail system without sending this information as an attachment to an electronic mail message. A user of an electronic mail program can attach an electronic file containing a set of instructions, such as a computer routine or script, to an electronic mail message prior to transmitting that message to designated recipients. In response to receiving this electronic mail message, a recipient can open and view the message within his or her electronic mail program. Although this message typically contains a message body presenting text-based content, the message also includes an indicator indicating the presence of an electronic file attached to the message. In response to the recipient taking an action to access this attached file, the set of instructions contained in this file are executed by the recipient's computer. The execution of these instructions results in the launch of a browser program for viewing content at a web site identified by the attached file and connected to a distributed computer network, such as an intranet or the global Internet.

The browser program can display the content for a predetermined web site identified by an address provided to the browser program in response to execution of the instruction set maintained by the electronic mail attachment. For example, this address can be a uniform resource locator (URL) or location identifier for a particular page of content at the predetermined web site. In this manner, accessing an electronic file attached to an electronic mail program results in the automated presentation of content posted at a web site identified by that electronic file. From the view of the electronic mail message recipient, this transition between the electronic mail program environment and the browser program environment is completed without manual interaction.

A user of an electronic mail program can avoid attaching a large electronic document for transmission via an electronic mail message by relying upon the present invention. Rather than attach a large document to the electronic mail message, the user can attach an electronic file containing an instruction set that, when executed by a computer, results in the presentation of content at a web site identified by that instruction set. The content represented by a large document, such as a multimedia presentation document, can now be communicated by a web site identified by an attached file of an electronic mail message rather than as a lengthy document attached to the electronic mail message. Advantageously, the present invention supports the efficient and convenient communication of information while avoiding the delay and storage issues associated with the transmission of a large document as an attachment to an electronic mail message.

Figure 1:
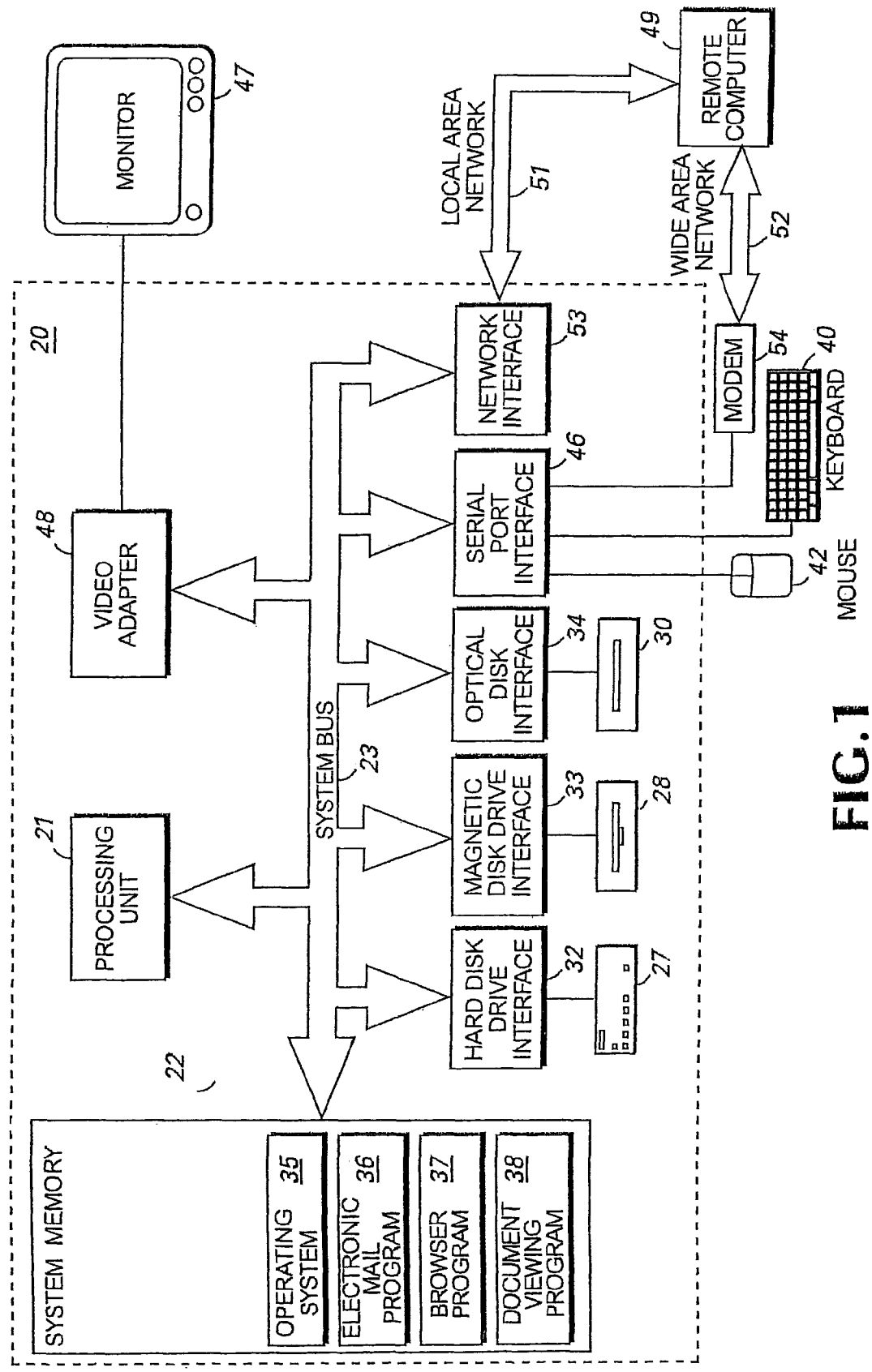
FIG. 1 is a block diagram illustrating the components of a computing environment that supports the operation of an exemplary embodiment of the present invention.

Turning now to the drawings, wherein like elements are represented by like numerals throughout the several drawings, FIG. 1 and the following discussion are intended to provide a brief, general description of a suitable computing environment in which the invention may be implemented. While the invention will be described in the general context of an electronic mail program and a browser program that runs on a personal computer, those skilled in the art will recognize that the invention also may be implemented in combination with other program modules. Moreover, those skilled in the art will appreciate that the invention may be practiced with other computer system configurations, including hand-held devices, multiprocessor systems, microprocessor-based or programmable consumer electronics, and the like.

With reference to FIG. 1, an exemplary system for implementing the invention includes a conventional personal computer 20 having a processing unit 21, a system memory 22, and a system bus 23 that couples the system memory to the processing unit 21. The personal computer 20 further includes a hard disk drive 27, a magnetic disk drive 28 and an optical disk drive 30, e.g., for reading a CD-ROM disk 31 or to read from or write to other optical media. The hard disk drive 27, the disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a flexible disk, and a CD-ROM disk, it should be appreciated by those skilled in the art that other types of media which are readable by a computer.

A number of program modules may be stored in the drives and the system memory 22, including an operating system 35, an electronic mail program 36, a browser program module 37, and a document viewing program 38. A user may enter commands and information into the personal computer 20 through a keyboard 40 and pointing device, such as a mouse 42. These input devices are often connected to the processing unit 21 through a serial port interface 46 that is coupled to the system bus 23, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The logical connections depicted in FIG. 1 include a local area network (LAN) 51 and a wide area network (WAN) 52. Such networking environments are commonplace in offices, enterprise-wide computer networks, intranets and the global Internet. When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46.

An exemplary embodiment of the present invention will be described in connection with representative examples of an electronic mail program, a document viewing program, and a representative browser program. For this exemplary embodiment, the electronic mail program is Hewlett-Packard's "OPENMAIL" program and the associated document viewing program is Inso Corporation's "QUICK VIEW PLUS" program. The browser program is the "NETSCAPE NAVIGATOR" browser distributed by Netscape Communications Corporation. Those skilled in the art will appreciate that other electronic mail, document viewing, and/or browser programs can be used to implement alternative embodiments of the present invention. For example, any browser program that can communicate with and display contents of a web site could be used. Consequently, the present invention is not limited to the components of the representative exemplary embodiment described below in connection with FIGS. 2-5.

Figure 2:
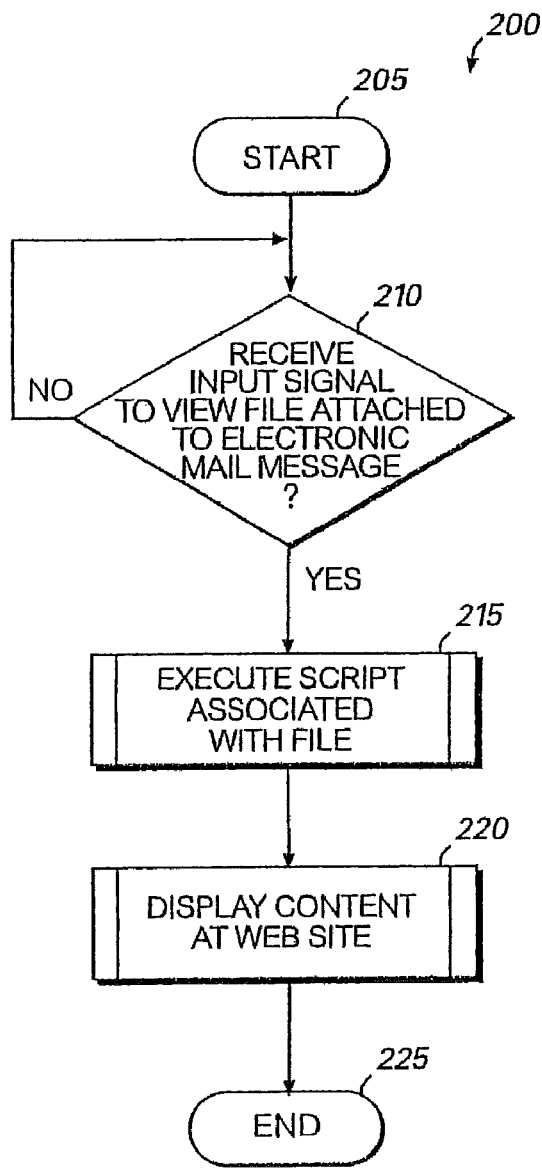
FIG. 2 is a logical flowchart diagram illustrating the tasks completed by an exemplary embodiment of the present invention.

FIG. 2 is a logical flowchart diagram that illustrates the primary tasks completed by an exemplary embodiment of the present invention. Specifically, FIG. 2 illustrates the tasks of a computer-implemented method 200 for presenting information at a predetermined web site in response to accessing an electronic file attached to an electronic mail message. Turning now to FIG. 2, the computer-implemented method 200 begins at the START step 205 for a selected electronic mail message having an attachment represented by an electronic file. The electronic mail message can be presented to a recipient on the display screen of a computer in response to operation of the electronic mail program, such as Hewlett-Packard's "OPENMAIL" program. The user is typically alerted to the existence of an electronic file attached to the electronic mail message by an indicator, such as an icon or text-based alert, in the tool bar or body of the electronic mail message. The attached electronic file contains a set of instructions, such as a computer program or script, rather than a lengthy document readable by a word processing or multi-media presentation program. This attached file contains the identity of a web site that maintains content intended for viewing by the recipient of this electronic mail message. The attached file is preferably smaller in size than the typical large document of a word processor program or a multi-media presentation program.

In decision block 210, an inquiry is conducted to determine whether an input signal has been received to view the file attached to the electronic mail message. If the response to this inquiry is negative, the "NO" branch is followed to step 205 and the process begins anew. Otherwise, the "YES" branch is followed from step 210 to step 215.

In step 215, the script associated with the attached file is executed by completing the instructions of the script. This execution of an instruction set, which is typically completed by the user's computer, results' in the launch of a browser, such as the "NETSCAPE NAVIGATOR" browser program, and the identification of a predetermined web site for viewing with the browser program. In addition, the script can include limited content, such as a message containing instructions to aid a user's viewing of the content associated with the attached file. For the exemplary embodiment, the script is implemented by a combination of JavaScript instructions and HyperText Markup Language (HTML) code.

In step 220, the content of a web site identified by the attached file is displayed to the user within the environment of the browser program. The web site can be hosted by a server connected to a distributed computer network, such as an intranet or the global Internet. The method 200 terminates at the END step 225.

In this manner, the exemplary embodiment enables a recipient of an electronic mail message having an attached file to access content published at a web site that is identified by the file rather than loading and opening an electronic mail attachment containing that content. The user experiences a transition from the operating environment of the electronic mail program to the browser program in response to accessing the attached file.

Figure 3:
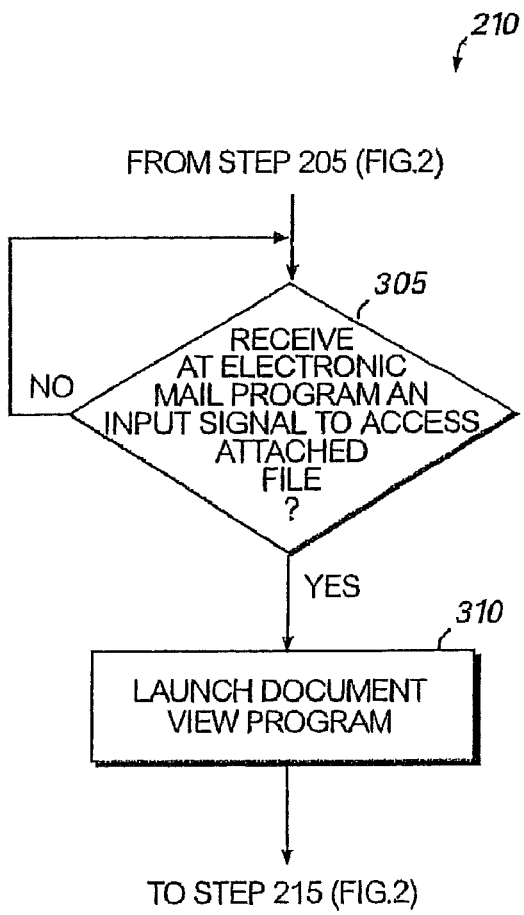
FIG. 3 is a logical flowchart diagram illustrating the steps of a method for accessing an electronic mail attachment in accordance with an exemplary embodiment of the present invention.
Figure 3A:
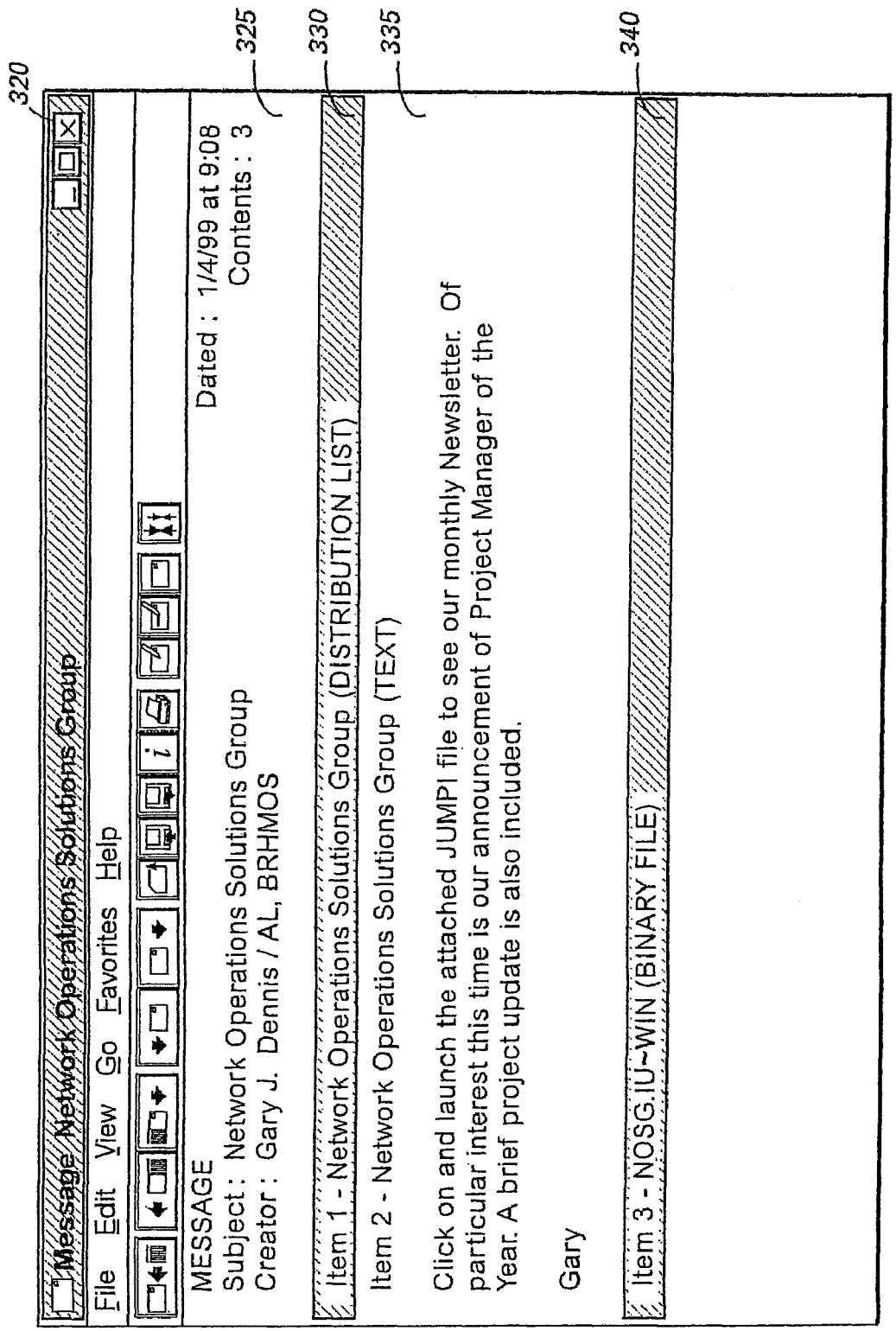
FIG. 3A is a display screen illustrating a representative electronic mail message having a file attachment.

Turning now to FIG. 3, which illustrates the tasks completed at the decision block 210, an inquiry is conducted at step 305 to determine whether an input signal has been received by the electronic mail program to access a file attached to an electronic mail message. As shown in FIG. 3A, a display screen 320 presents a representative electronic mail message containing a header 325, a distribution list 330 identifying intended recipients, a text-based message body 335, and an electronic file 340 attached to the electronic mail message. The header 325 identifies the subject "Network Operations Solutions Group" of the electronic mail message and the creator or sender of the message, "Gary J. Dennis." The distribution list 330, identified as item 1 of the electronic mail message, is a list of intended recipients for the electronic mail message. The message body 335, identified as item 2, contains a message for viewing by the intended recipients upon receipt of the electronic mail message. The electronic file 340 is attached to the electronic mail message and is identified as item 3. For the representative example, the electronic file 340 is a binary file identified by the file name "NOSGJU.about.1.HTM." To access the attached file 340 in step 305, a user can position a position indicator, such as a cursor, proximate to the file 340 and transmit an input signal via an input device, typically by double-clicking a button on a pointing device, such as a mouse.

If the response to the inquiry in step 305 is negative, the "NO" branch is followed to step 205 (FIG. 2), which is the entry point to the decision block 305. In response to receiving an input signal at the electronic mail program to access the attached file in step 305, the "YES" branch is followed to step 310. In step 310, a document viewing program, such as Inso Corporation's "QUICK VIEW PLUS" program, is launched to display content, if any, contained within the attached file, such as the electronic file 340. The attached file typically contains a limited amount of data for presentation to the user via the document viewing program. For example, the attached file can contain a text-based message, such as an instruction message defining user instructions for viewing the remaining content associated with that file. For the exemplary embodiment, the content available for viewing by the document viewing program is HTML-coded content maintained in the attached file 340. Consequently, the attached file 340 includes an ".htm" extension to enable the preferred "QUICK VIEW PLUS" program to recognize and operate on the HTML-coded content of that file.

Figure 4A:
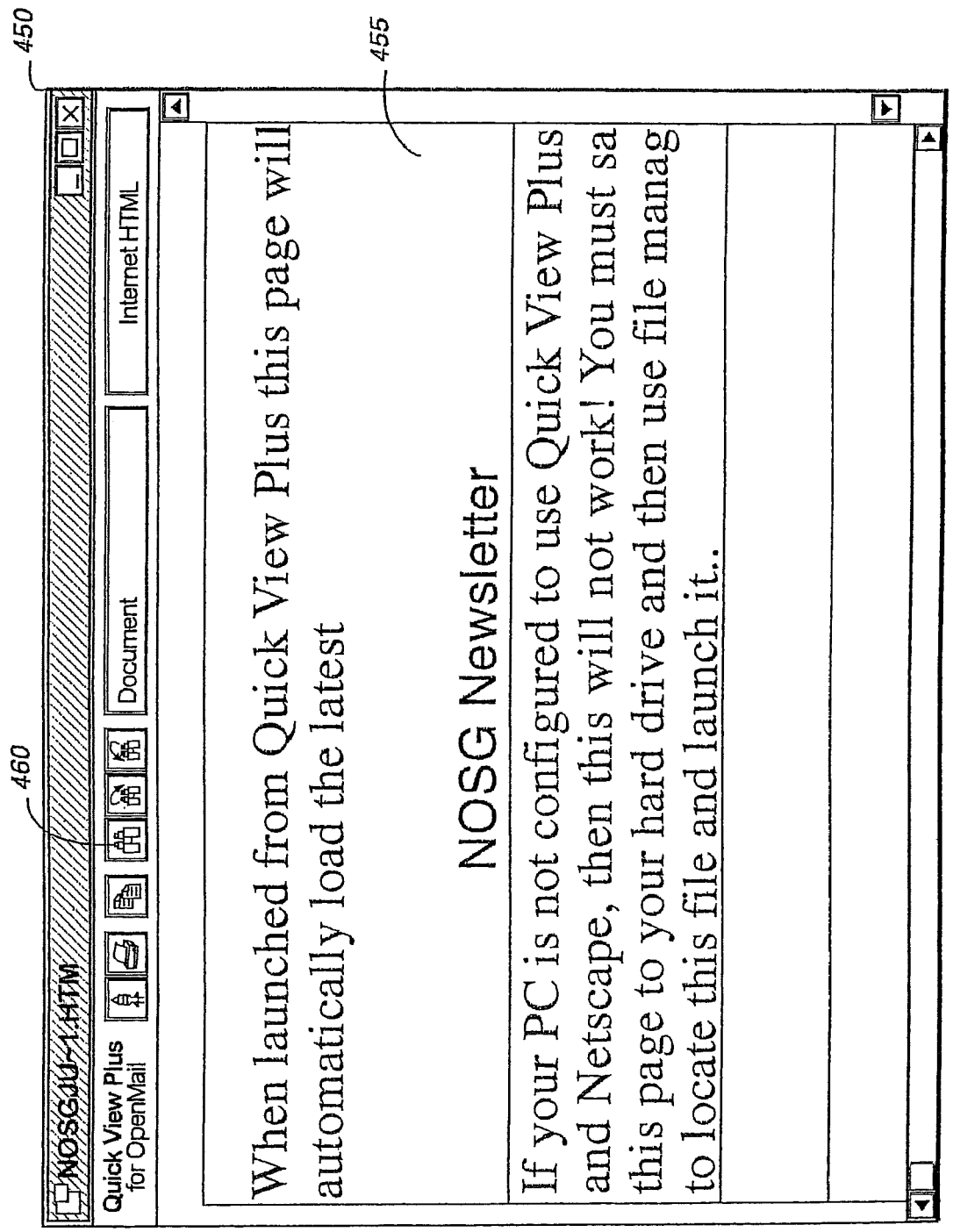
FIG. 4A is a display screen of message content of an electronic mail attachment presented by a document viewing program in accordance with an exemplary embodiment of the present invention.

Turning now to FIG. 4, which illustrates the tasks associated with execution of the script for the attached file during step 215 (FIG. 2), the content, if any, of the attached file is displayed to the user by the document viewing program in step 405. The "viewable" content contained in the attached file is presented on the display screen of the computer to the user in response to receiving an input signal to view the attached file in step 210 (FIG. 2). The electronic mail program responds to this input signal by launching a document viewing program, which can read the content contained in the attached file and display that content in a viewing format recognizable by the user. For the exemplary embodiment, the content of the attached file is a limited-size, text-based message containing instructions for viewing a much larger data set associated with the attached file. A representative example of limited "viewable" content contained in the attached file is shown in FIG. 4A as a user instruction message within the environment of a document viewing program.

Turning briefly to FIG. 4A, a display screen 450 presents a view of content contained in the file attached to the electronic mail message and displayed in the environment of a document view program, such as the "QUICK VIEW PLUS" program. The message content of this attached file is presented as a user instruction message 455 within the body of the display screen 450. For the representative example of an instruction message, the text-based content advises that selection of the launch control of the document view program will result in the automatic loading of the "NOSG Newsletter". The "NOSG Newsletter" is maintained at a web site, rather than stored within the file attached to the electronic mail message. Consequently, the instruction message further advises the user that this loading operation will not work if his or her computer is not configured for operation with both a document viewing program and a browser program, such as the "QUICK VIEW PLUS" and "NETSCAPE NAVIGATOR" programs. The computer user must also have access to web sites via the browser program and a connection to the computer network. The instruction message further advises that the file manager of the operating system for the computer can be used to locate the file attached to the electronic mail message and to launch that file in the event that the computer is not configured to use the specified document viewing and browser programs.

Although the exemplary embodiment relies upon the storage of limited message content and a script within the file attached to the electronic message to assist a user's transition from the electronic mail program environment to a browser program environment, those skilled in the art will appreciate that other types of content can be placed in the attached file. For example, the viewable content described above as an instruction message merely instructs the electronic mail recipient to launch the file for viewing at a web site. However, any content maintained within the file attached to the electronic mail message preferably should have a limited storage size to obtain the advantages offered by the present invention over the prior communication of large documents or files via electronic mail systems. Indeed, there is no requirement to place viewable content within the attached file for the electronic mail message. The absence of any viewable content for the attached file, however, may result in user confusion because launching the document viewing program in response to accessing an attached file having no viewable content would not satisfy the user's expectation of content within the viewing area of the document view program.

The user interface of the document viewing program shown in the display screen 450 of FIG. 4A includes a launch control 460 available in the toolbar of this program. In response to the user selecting the launch control 460, an input signal is transmitted to launch the attached file of the electronic mail message. For the representative example, the attached file named "NOSGJU.about.1.HTM" is "launched" in response to a user's selection of the launch control 460 of the document viewing program.

Returning to FIG. 4, in decision block 410, an inquiry is conducted to determine whether the document view program has received an input signal to launch the attached file of the electronic mail message. If the user has not selected the launch control 460, as shown in the display screen 450 of FIG. 4A, the "NO" branch is followed to step 405 and the process begins anew. Otherwise, the "YES" branch is followed from step 410 to step 415 and the execution of instructions of the script contained in the attached file continues in step 415. A browser program is launched in step 415 in response to execution of the script instructions.

Figure 4B:
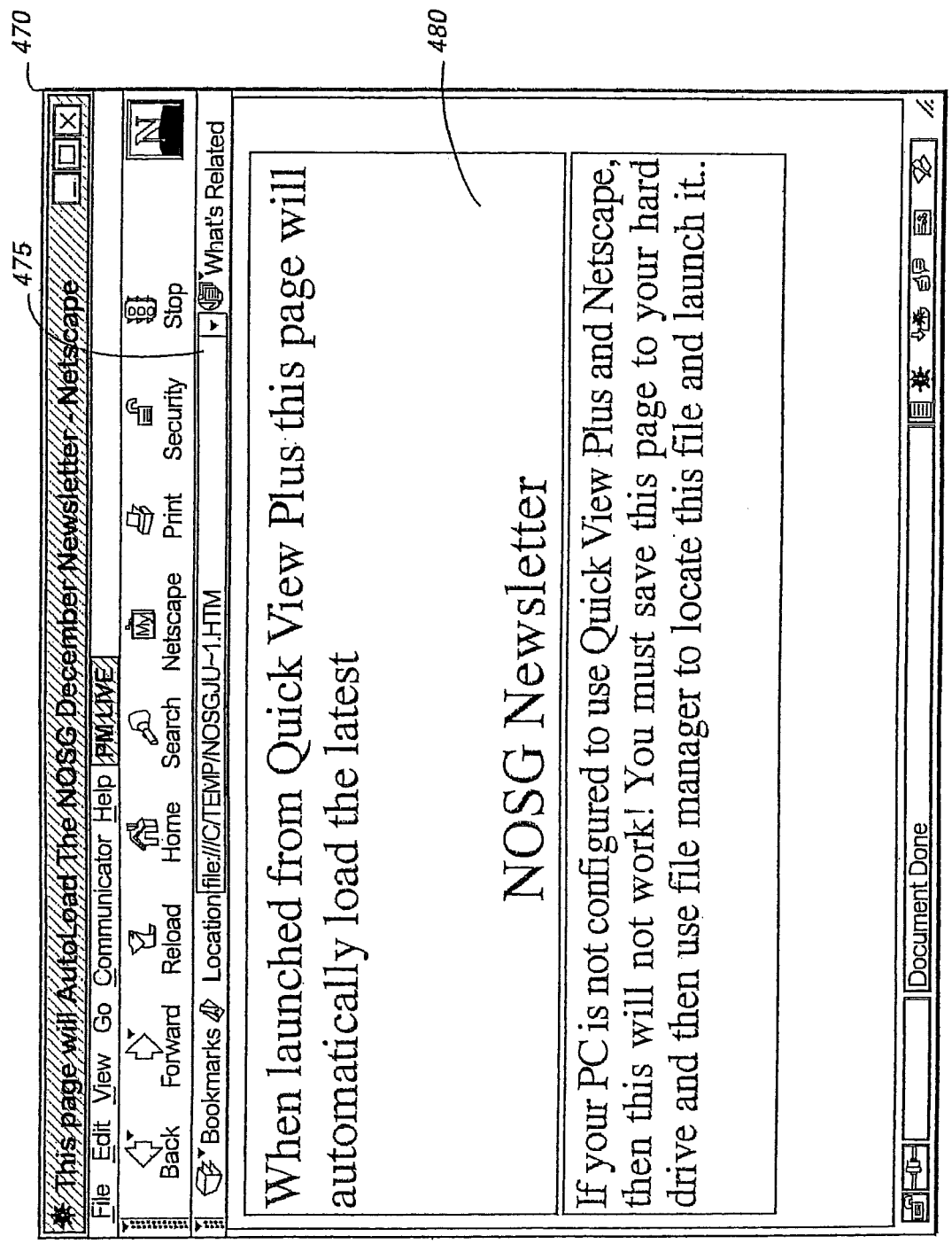
FIG. 4B is a display screen showing an initial view of message content of an electronic mail attachment presented by a browser program.

As shown in FIG. 4B, the launching of the browser program in step 415 results in an echoing of the message content contained in the attached file within an initial viewing window of the browser program. An initial window 470 is opened by the browser program in response to the instructions of the script for the attached file of the electronic mail message. The initial window 470 is quickly opened and closed by the browser program, however, before the user has an opportunity to actually view any content associated with this window. Although the file can access and manipulate the web site content in a manner consistent with the operation of a conventional browser program.

Figure 5A:
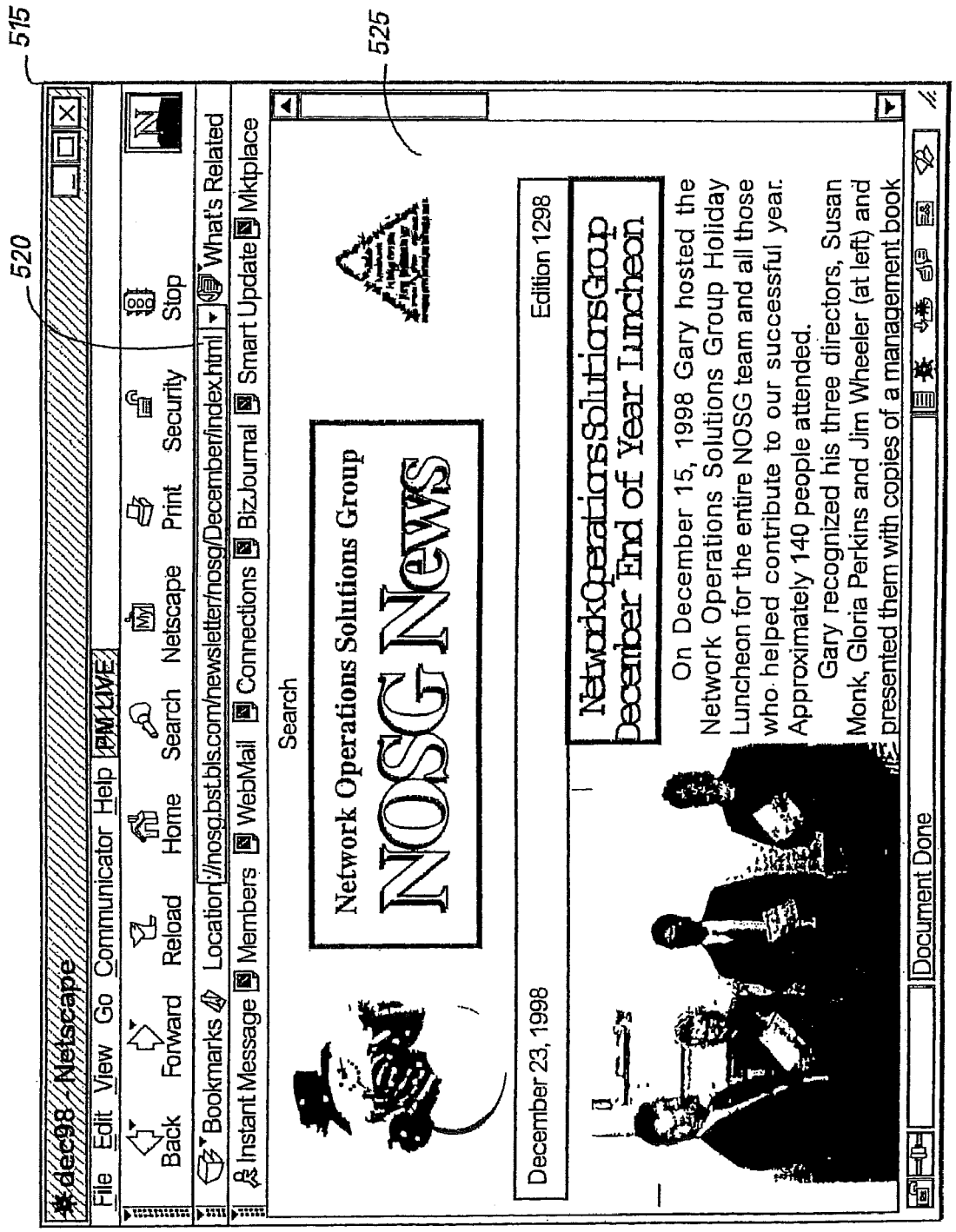
FIG. 5A is a display screen of representative content presented by a browser program in response to opening a web site link associated with an electronic mail attachment in accordance with an exemplary embodiment of the present invention.

FIG. 5A illustrates a display screen for a browser program having a view window presenting content associated with the attached file of an electronic mail message. Turning now to FIG. 5A, a display screen 515 includes an identifier 520 and a view window 525. The identifier 520, shown as the location "://nosg.bst.bls.com/newsletter/nosg/December/index-.html," defines the address for a particular page of a web site that is available for viewing by the browser program. The view window 525 presents the content associated with the particular page of the web site identified by the identifier 520. For the representative example, an electronic newsletter, entitled "NOSG News," is shown within the view window 525 of the browser program. The presentation of the newsletter via a web site, rather than as an electronic document directly launched by an electronic mail program or a document viewing program, is advantageous because the electronic mail attachment containing the web site identifier can be quickly loaded by a recipient while conserving the storage capacity of an electronic mail system. A newsletter such as the representative example would likely have been a file of a megabyte or more of data that would have traversed an electronic mail network. With the present invention, a smaller file, typically less than 1-2 kilobytes, can be used to route a mail user to a web site.

Upon viewing the content available at the web site via the browser window, the user can exit the view of this content by closing the browser window. For the exemplary embodiment, closing this browser window can result in the display of the underlying view window of the document viewing program. The user can close this view window to return to the electronic mail program.

Table I provides a listing of a representative script for an electronic file that can be attached to an electronic mail message to support the operation of an embodiment of the present invention initial window 470 contains a file identifier 475 and a message 480, the user preferably does not have an opportunity to view this information prior to a closing of the initial window. Another window is quickly opened by the browser program, however, to present the lengthy content associated with the attached file, namely the content hosted at the web site.

Those skilled in the art will appreciate that an embodiment of the present invention can be implemented without opening an initial window that echoes the HTML-coded content of the electronic file attached to the electronic mail message. By this alternative embodiment, the initial window of the browser program could instead present content maintained at a web site hosted by a remote server on a distributed computer network.

Turning again to the logical flowchart diagram of FIG. 4, in step 420, the execution of instructions in the attached file results in providing the browser program with an identifier, such as a hyperlink or address, for a web site hosted by a remote server connected to an intranet or the global Internet. In response to the identifier for this web site, the browser program can open a window presenting content maintained by that identified web site, as described in more detail below with respect to FIG. 5. For example, if the identifier provided by the attached file is a URL or locator identifier, the browser program will establish a connection to the remote server that hosts the identified web site based on the address provided by that identifier. In this manner, the recipient of the electronic mail message can view the content of a web site by accessing an electronic file attached to an electronic mail message.

FIG. 5 is a logical flowchart diagram illustrating an exemplary method for displaying content associated with an attached file for an electronic mail message. Turning now to FIG. 5, which illustrates the tasks completed in step 220 (FIG. 2), a link to an identified web site is opened in step 505 by the browser program. The address or identifier for this link is provided to the browser program in response to opening the electronic file attached to the electronic mail message. This link typically identifies a particular page of a selected web site for viewing by a recipient of the electronic mail message. In step 510, the content of the identified web site is displayed within a view window of the browser program. A recipient of the electronic mail message having the attached

TABLE I

```
<head><script LANGUAGE="JavaScript" FOR=
"window" EVENT="onload( )">
<!--
window.open('http://nosg.bst.bls.com/newlett/K2/index.html')
window.close( )
//-->
</script>
<title>This page will AutoLoad Network Operations Solutions Group
Newsletter</title>
<meta name="GENERATOR" content="Microsoft FrontPage 3.0">
</head>
<body>
<div align="left">
<table border="0">
<tr>
<td bgcolor="#C0C0C0"><p align="center"><strong><big><big>When
launched from
Quick View Plus this page will automatically load the latest </big></big>
</strong></p>
<p align="center"><strong><big><big><fontface="Copperplate Gothic
Bold"
color="#FF0080"><big>NOSG
Newsletter</big></font></big></big></strong></td>
</tr>
<tr>
<td bgcolor="#808080"><big><font color="#004080"><strong>;
If your PC is not
configured to use Quick View Plus and Netscape, then this will not work!
You must save
this page to your hard drive and then use file manager to locate this file
and launch it.
</strong><font></big></td>;
</tr>
</table>
</div>
<p>
</p>
</body>
</html>
```

The representative script shown in Table I contains two instruction sets, a script containing JavaScript language instructions (highlighted in bold print) and an HTML-coded instruction section defining the text of an instruction message. The script instructions, executed by the computer, support the opening of a view window of the browser program to present the content of an identified web site. This operation is distinguishable from the opening of a hyperlink within the body of an electronic mail message. The HTML-coded content can support the presentation of the instruction message by the document view program, prior to launching the browser program to access content at the identified web site, and the brief display of this message within the initial view window of the browser program.

Referring to Table I, the header portion of the content of the electronic mail attachment is positioned between a pair of <head> HTML tags. The header contains the JavaScript language commands, highlighted in bold print, and positioned between a pair of <script> HTML tags. In response to executing the JavaScript commands, the browser program opens an additional view window to display the content published at the web site identified by "http://nosg.bst.bls.com/newlett/K2/indexed.html". The next JavaScript command closes the browser window containing the initial instruction message from the viewer program associated with the electronic mail system. This leaves the browser with one open window containing the selected web site page. For this representative example, this address provides a link to the "Network Operations Solutions Group's NOSG News."

The remaining portion of the attached file is represented by an HTML-coded instruction section placed between the <body> HTML tags. This section represents the user instruction message presented to the user in response to accessing the attached file and launching the document view program. This instruction message is also briefly echoed within an initial window of the browser program in response to the transition between the document view program and the browser program, as noted above. The HTML codes provide format instructions for displaying the instruction message within a view window. The representative instruction message is shown in FIG. 4A.

When launched from Quick View Plus this page will automatically load the latest NOSG newsletter. If your PC is not configured to use Quick View Plus and Netscape, then this will not work! You must save this page to your hard drive and then use File Manager to locate this file and launch it.

It will be appreciated that the variety of instructions and/or messages can be included within an electronic file that is attached to an electronic mail message. The present invention is not limited to the representative example shown in Table I. Nevertheless, Table I illustrates that the storage size for the preferred electronic file attachment is small when compared a conventional word processing or multi-media document that might otherwise be attached as a file to an electronic mail message. Consequently, the transition from an electronic mail program environment to a browser program environment in response to accessing an electronic mail attachment provides an efficient and effective mechanism for accessing content associated with the attached electronic file.

Alternative embodiments will become apparent to those skilled in the art to which the present invention pertains without departing from its spirit and scope. Accordingly, the scope of the present invention is defined by the appended claims rather than the foregoing description and drawings.

What is claimed is:

1. A computer-implemented method for communicating content intended for delivery to a recipient of an electronic mail message having an attached electronic file, containing an identity of a remote server computer, comprising:
   accessing the attached electronic file at a computer;
   obtaining the identity of a remote device hosting the content in response to accessing the attached electronic file;
   executing at the computer a script included in the attached electronic file to execute a document view program at the computer displaying an instruction message for accessing content and displaying a launch control icon; and
   responsive to a selection of the launch control, displaying the content intended for delivery to the recipient of the electronic mail message by using the identity to establish a connection with the remote device.

2. The computer-implemented method of claim 1, wherein displaying the content intended for delivery to the recipient of the electronic mail message comprises:
   launching a browser program;
   providing the browser program with the identity of the remote device hosting the content;
   establishing a connection by the browser program with the remote device;
   displaying the content within a viewing window of the browser program.

3. The computer-implemented method of claim 1, wherein the remote device hosts a web site containing the content intended for delivery to the recipient of the electronic mail message and the attached electronic file only contains instructions for accessing the content at the web site.

4. The computer-implemented method of claim 1 further comprising displaying a message contained in the attached electronic file.

5. The computer-implemented method of claim 4, wherein displaying a message contained in the attached electronic file comprises:
   launching a document viewing program;
   displaying the message within a viewing window of the document viewing program.

6. The computer-implemented method of claim 5, wherein the message of the electronic file attachment comprises a text-based instruction message comprising instructions to aid the recipient's access to the content maintained by the remote device.

7. The computer-implemented method of claim 4, further comprising opening a browser program by launching the file attachment from a viewer program to access the content at the remote device in response to JavaScript commands contained in the electronic file attachment.

8. The computer-implemented method of claim 1, wherein the remote device is a computer server.

9. An electronic device-implemented method for communicating content intended for delivery to a recipient of an electronic message having an attached electronic file, containing an identity of a remote device, comprising:
   accessing the attached electronic file at a computer;
   obtaining the identity of a remote device hosting the content in response to accessing the attached electronic file;
   executing at the computer a script included in the attached electronic file to execute a document view program at the computer displaying an instruction message for accessing content and offering a launch control icon; and
   responsive to a selection of the launch control, providing the content intended for delivery to the recipient of the electronic message by using the identity to establish a connection with the remote device.

10. The electronic device-implemented method of claim 9 wherein the remote device hosts a web site containing the content intended for delivery to the recipient of the electronic message and the attached electronic file only contains instructions for accessing the content at the web site.

11. The electronic device-implemented method of claim 9 further comprising delivering a message contained in the attached electronic.

12. The electronic device-implemented method of claim 11 wherein the message of the attached electronic file comprises a text-based instruction message comprising instructions to aid the recipient's access to the content maintained by the remote device.

13. The electronic device-implemented method of claim 11 further comprising opening a browser program by launching the file attachment from a viewer program to access the content at the remote device in response to JavaScript commands contained in the electronic file attachment.

14. The electronic device-implemented method of claim 9, wherein the remote device is a computer server.

* * * * *